United States Patent
Liang et al.

(10) Patent No.: US 11,172,447 B2
(45) Date of Patent: Nov. 9, 2021

(54) METHOD AND APPARATUS FOR SENDING INFORMATION AND CHANNEL MONITORING PROCESSING

(71) Applicant: CHINA ACADEMY OF TELECOMMUNICATIONS TECHNOLOGY, Beijing (CN)

(72) Inventors: Jing Liang, Beijing (CN); Wei Bao, Beijing (CN); Fangli Xu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 69 days.

(21) Appl. No.: 16/499,269

(22) PCT Filed: Feb. 24, 2018

(86) PCT No.: PCT/CN2018/077150
§ 371 (c)(1),
(2) Date: Sep. 29, 2019

(87) PCT Pub. No.: WO2018/177052
PCT Pub. Date: Oct. 4, 2018

(65) Prior Publication Data
US 2021/0112495 A1 Apr. 15, 2021

(30) Foreign Application Priority Data
Mar. 31, 2017 (CN) .......................... 201710208789.3

(51) Int. Cl.
*H04W 52/02* (2009.01)
*H04W 68/00* (2009.01)

(52) U.S. Cl.
CPC ..... *H04W 52/0235* (2013.01); *H04W 68/005* (2013.01)

(58) Field of Classification Search
CPC .................. H04W 52/0235; H04W 68/005
See application file for complete search history.

(56) References Cited

U.S. PATENT DOCUMENTS

| | | | | |
|---|---|---|---|---|
| 2006/0087993 | A1* | 4/2006 | Sengupta | H04W 52/0229 370/310 |
| 2008/0096614 | A1* | 4/2008 | Venkatachalam | H04W 76/27 455/574 |

(Continued)

FOREIGN PATENT DOCUMENTS

| | | |
|---|---|---|
| CN | 104303586 A | 1/2015 |
| CN | 104350795 A | 2/2015 |

(Continued)

OTHER PUBLICATIONS

Samsung et al., "eDRX Paging Hyper-Frame Calculation", 3GPP TSG-RAN WG2 Meeting #94, Nanjing, May 23-27, 2016, total 2 pages, R2-164574.

(Continued)

*Primary Examiner* — Christine Ng
(74) *Attorney, Agent, or Firm* — Kilpatrick Townsend & Stockton, LLP

(57) ABSTRACT

Disclosed are a method and apparatus for sending information and channel monitoring processing. The method comprises: when a terminal receives a wake-up signal and is woken up, monitoring, within a time window, a paging channel and/or a control channel in a discontinuous reception or an extended discontinuous reception manner; if the terminal receives a paging message and/or control channel scheduling information within the time window, then processing the paging message and/or processing the control channel scheduling information; and if the terminal does not receive a paging message and/or control channel scheduling information within the time window, then not monitoring the paging channel and/or control channel any more, and con- (Continued)

tinuing to receive a wake-up signal. A base station sends the wake-up signal to the terminal, and sends, within a time window, information over a paging channel and/or a control channel in a discontinuous reception or an extended discontinuous reception manner. By means of the present application, it can be ensured that a terminal saves electricity, and that a service of the terminal can be reached.

14 Claims, 4 Drawing Sheets

(56) References Cited

U.S. PATENT DOCUMENTS

| | | | |
|---|---|---|---|
| 2009/0221284 A1* | 9/2009 | Kim | H04L 5/0053 455/426.1 |
| 2010/0214969 A1 | 8/2010 | Lamm et al. | |
| 2012/0069827 A1* | 3/2012 | Lee | H04W 52/0274 370/338 |
| 2012/0195240 A1* | 8/2012 | Kim | H04W 52/0216 370/311 |
| 2013/0044661 A1* | 2/2013 | Jokimies | H04W 52/0274 370/311 |
| 2013/0188503 A1* | 7/2013 | Anepu | H04W 36/08 370/252 |
| 2013/0237257 A1* | 9/2013 | Walke | H04W 68/00 455/458 |
| 2015/0173039 A1 | 6/2015 | Rune et al. | |
| 2016/0142974 A1* | 5/2016 | Lindoff | H04W 52/0209 370/311 |
| 2017/0188386 A1* | 6/2017 | Hoglund | H04W 72/0453 |
| 2020/0037242 A1* | 1/2020 | Yilmaz | H04W 52/0216 |

FOREIGN PATENT DOCUMENTS

| | | |
|---|---|---|
| KR | 20110081724 A | 7/2011 |
| KR | 20120109050 A | 10/2012 |
| WO | 2016072770 A1 | 5/2016 |

OTHER PUBLICATIONS

Intel Corporation,"Remaining issues in eDRX PH and PTW calculations", 3GPP TSG RAN WG2 Meeting #95, Gothenburg, Sweden, Aug. 22-26, 2016, total 5 pages, R2-164998.

Qualcomm Incorporated,"Wake-Up Schemes for DRX in NR", 3GPP TSG-RAN WG2 Meeting #96, Reno, US, Nov. 14-18, 2016, total 4 pages, R2-168612.

Internet; 3rd Generation Partnership Project; Technical Specification Group Radio Access Network; Evolved Universal Terrestrial Radio Access (E-UTRA); User Equipment (UE) procedures in idle mode; Release 14; 3GPP TS 36.304 V14.2.0; Mar. 22, 2017.

Huawei et al: "Considerations on 'wake-up signal' for eFeMTC", 3GPP TSG RAN WG1 Meeting #88bis; R1-1704282, Spokane, USA; Apr. 3, 2017-Apr. 7, 2017.

Ericsson: "Power consumption reduction for paging and connected-mode DRX", 3GPP TSG RAN1 Meeting #88bis; R1-1705192, Spokane, Washington, USA; Apr. 3, 2017-Apr. 7, 2017.

CATT: "Motivation of UE Wakeup Mechanism in NR", 3GPP TSG RAN Meeting #75; RP-170410, Dubrovnik, Croatia; Mar. 6, 2017-Mar. 9, 2017.

Qualcomm Incorporated,"Efficient monitoring of DL control channels", 3GPP TSG RAN WG1 Meeting #88bis, Spokane, Washington, USA, Apr. 3-7, 2017, total 7 pages, R1-1705012.

* cited by examiner

METHOD AND APPARATUS FOR SENDING INFORMATION AND CHANNEL MONITORING PROCESSING

CROSS-REFERENCE

This application is a US National Stage of International Application No. PCT/CN2018/077150, filed on Feb. 24, 2018, designating the United States and claiming the priority of Chinese Patent Application No. CN 201710208789.3, filed with the Chinese Patent Office on Mar. 31, 2017, and entitled "A method and apparatus for transmitting information, and a method and apparatus for monitoring a channel". The entire content of each of the disclosures is incorporated herein by reference.

FIELD

The present disclosure relates to the field of wireless communications, and particularly to a method and apparatus for transmitting information, and a method and apparatus for monitoring a channel.

BACKGROUND

FIG. 1 is a schematic diagram illustrating how a wake-up signal works. As illustrated by FIG. 1, when User Equipment (hereinafter "UE") is idle, it enters a sleep mode where very low power is consumed. When the network side apparatus needs to transmit downlink data to the UE, it transmits a wake-up signal to the UE, and the UE wakes up upon reception of the wake-up signal to transmit and receive data with the network side apparatus. The UE enters the sleep mode after completing transmission and reception of the data.

According to an existing paging mechanism of the Long Term Evolution (hereinafter "LTE") system, UE wakes up periodically to receive a paging message according to the Discontinuous Reception (hereinafter "DRX") scheme. The paging cycle of the UE using the DRX paging scheme is a UE-specific paging cycle of a core network, or a default paging period broadcasted by a base station, whichever is shorter. The paging cycle of UE using the extended DRX (hereinafter "eDRX") scheme involves an eDRX paging cycle of the core network and a Paging Time Window (hereinafter "PTW"). And in a PTW, the UE monitors a paging message according to a default paging cycle broadcasted by the base station. The paging cycles of the DRX and the eDRX schemes are different. FIG. 2 is a schematic diagram of DRX paging, and FIG. 3 is a schematic diagram of eDRX paging. A paging message can be transmitted via a radio interface as illustrated in FIG. 2 or FIG. 3.

In the LTE system, a paging radio frame and a paging sub-frame of the UE in the DRX scheme are calculated as follows.

For the paging radio frame: SFN mod T=(T div N)* (UE_ID mod N).

For the paging sub-frame: i_s=floor(UE_ID/N) mod Ns.

Where T is the DRX paging cycle, nB is the paging density, N=min(T, nB), Ns=max(1,nB/T), and UE_ID=IMSI mod 1024.

The time when the UE shall monitor a paging message can be calculated according to the equations above.

A drawback of the existing technology lies in that the UE shall wake up periodically to monitor a paging message, wasting energy of the UE (the UE receives no paging message for most of the time). Although less power of the UE is consumed when using a wake-up signal, there has been absent so far a solution to coordinating the wake-up signal with the paging message.

SUMMARY

Embodiments of the disclosure provide a method and apparatus for transmitting information and a method and apparatus for monitoring a channel.

An embodiment of the disclosure provides a method for monitoring a channel. The method includes: monitoring, by UE, a channel by using a DRX or eDRX scheme in a time window after being woken up upon reception of a wake-up signal; processing information when the UE receives the information in the time window; and stopping monitoring the channel, and continuing to monitor the wake-up signal when the UE does not receive the information in the time window. The channel includes a paging channel, and the information includes a paging message. And/or, the channel includes a control channel, and the information includes control channel scheduling information.

According to an implementation mode of the embodiment of the disclosure, continuing to monitor the wake-up signal includes: continuing to monitor the wake-up signal after entering a sleep mode.

According to an implementation mode of the embodiment of the disclosure, the wake-up signal is transmitted by a network side apparatus.

According to an implementation mode of the embodiment of the disclosure, the UE enters a sleep mode upon determining according to system information or a broadcast that a network side apparatus supports transmission of the wake-up signal, or enters the sleep mode according to a network configuration.

According to an implementation mode of the embodiment of the disclosure, monitoring, by the UE, the channel by using the DRX or eDRX scheme in the time window after being woken up upon reception of the wake-up signal includes: entering an idle or inactive state, starting a time window, and monitoring the paging channel by using the DRX or eDRX scheme in the time window, after the UE entering a sleep mode from the idle or inactive state is woken up upon reception of the wake-up signal. A length of the time window is prescribed by a protocol, configured by a network side apparatus via a broadcast, or configured by the network side apparatus via dedicated signaling.

According to an implementation mode of the embodiment of the disclosure, the time window is implemented by using a timer, or the time window is a period of time for receiving N paging messages. N is an integer equal to or more than 1.

According to an implementation mode of the embodiment of the disclosure, monitoring, by the UE, the channel by using the DRX or eDRX scheme in the time window after being woken up upon reception of the wake-up signal includes: entering a connected state, starting a time window, and monitoring the control channel by using the DRX or eDRX scheme in the time window, after the UE entering a sleep mode from the connected state is woken up upon reception of the wake-up signal. A length of the time window is configured by a network side apparatus via dedicated signaling.

According to an implementation mode of the embodiment of the disclosure, the time window is implemented by using a timer.

According to an implementation mode of the embodiment of the disclosure, when the UE in a sleep mode has uplink data to transmit, the method further includes: waking up the UE, and transmitting the uplink data.

According to an implementation mode of the embodiment of the disclosure, the method further includes: reading system information after the UE is woken up; or, reading the system information, and entering a sleep mode, after the UE in the sleep mode is woken up by the wake-up signal transmitted by the network side apparatus when the system information is updated.

An embodiment of the disclosure provides a method for transmitting information. The method includes: transmitting a wake-up signal to UE; transmitting information over a channel in a time window by using a DRX or eDRX scheme when the information needs to be transmitted in the time window; and refraining from transmitting the information over the channel by using the DRX or eDRX scheme in the time window when the information does not need to be transmitted in the time window. The channel includes a paging channel, and the information includes a paging message. And/or, the channel includes a control channel, and the information includes control channel scheduling information.

According to an implementation mode of the embodiment of the disclosure, the UE is such UE that stops monitoring the channel and continues to monitor the wake-up signal after entering a sleep mode when the UE does not receive the information in the time window.

According to an implementation mode of the embodiment of the disclosure, the UE is such UE that enters a sleep mode upon determining according to system information or a broadcast that a network side apparatus supports transmission of the wake-up signal, or is such UE that enters the sleep mode according to a network configuration.

According to an implementation mode of the embodiment of the disclosure, when the UE entering a sleep mode from an idle or inactive state enters the idle or inactive state after being woken up by the wake-up signal, a length of the time window is prescribed by a protocol, configured by a network side apparatus via a broadcast, or configured by the network side apparatus via dedicated signaling.

According to an implementation mode of the embodiment of the disclosure, the time window is implemented by using a timer, or may be a period of time for receiving N paging messages. N is an integer equal to or more than 1.

According to an implementation mode of the embodiment of the disclosure, when the UE entering a sleep mode from a connected state enters the connected state after being woken up upon reception of the wake-up signal, a length of the time window is configured by a network side apparatus via dedicated signaling.

According to an implementation mode of the embodiment of the disclosure, the time window is implemented by using a timer.

According to an implementation mode of the embodiment of the disclosure, the method further includes: transmitting the wake-up signal to the UE so that the UE in a sleep mode reads system information when the system information is updated.

An embodiment of the disclosure provides an apparatus for monitoring a channel. The apparatus includes a monitoring module and a processing module. The monitoring module is configured to monitor a channel by using a DRX or eDRX scheme in a time window after UE is woken up upon reception of a wake-up signal. The processing module is configured to: process information when the UE receives information in the time window, and stop monitoring the channel and continue to monitor the wake-up signal when the UE does not receive the information in the time window. The channel includes a paging channel, and the information includes a paging message. And/or, the channel includes a control channel, and the information includes control channel scheduling information.

According to an implementation mode of the embodiment of the disclosure, the processing module is further configured to continue to monitor the wake-up signal after entering a sleep mode.

According to an implementation mode of the embodiment of the disclosure, when the monitoring module is configured to receive the wake-up signal, the monitoring module is further configured to receive the wake-up signal transmitted by a network side apparatus.

According to an implementation mode of the embodiment of the disclosure, the UE is such UE that enters a sleep mode upon determining according to system information or a broadcast that a network side apparatus supports transmission of the wake-up signal, or is such UE that enters the sleep mode according to a network configuration.

According to an implementation mode of the embodiment of the disclosure, when the monitoring module is configured to monitor the channel by using the DRX or eDRX scheme in the time window after the UE is woken up upon reception of the wake-up signal, the monitoring module is further configured to: enter an idle or inactive state, start a time window, and monitor the paging channel by using the DRX or eDRX scheme in the time window, after the UE entering a sleep mode from the idle or inactive state is woken up upon reception of the wake-up signal. A length of the time window is prescribed by a protocol, configured by a network side apparatus via a broadcast, or configured by the network side apparatus via dedicated signaling.

According to an implementation mode of the embodiment of the disclosure, the time window is implemented by using a timer, or the time window is a period of time for receiving N paging messages. N is an integer equal to or more than 1.

According to an implementation mode of the embodiment of the disclosure, when the monitoring module is configured to monitor the channel by using the DRX or eDRX scheme in the time window after the UE is woken up upon reception of the wake-up signal, the monitoring module is further configured to: enter a connected state, start a time window, and monitor the control channel by using the DRX or eDRX scheme in the time window, after the UE entering a sleep mode from the connected state is woken up upon reception of the wake-up signal. A length of the time window is configured by a network side via dedicated signaling.

According to an implementation mode of the embodiment of the disclosure, the time window is implemented by using a timer.

According to an implementation mode of the embodiment of the disclosure, the apparatus further includes: an uplink data transmitting module, configured to wake up itself to transmit uplink data when the UE in a sleep mode needs to transmit the uplink data.

According to an implementation mode of the embodiment of the disclosure, the apparatus further includes: an updating module, configured to read system information after the UE is woken up; or read the system information and enter a sleep mode after the UE in the sleep mode is woken up by the wake-up signal transmitted by the network side apparatus when the system information is updated.

An embodiment of the disclosure provides an apparatus for transmitting information. The apparatus includes a wake-up signal transmitting module and an information transmitting module. The wake-up signal transmitting module is configured to transmit a wake-up signal to UE. The information transmitting module is configured to: transmit information over a channel in a time window by using a DRX or eDRX scheme when the information needs to be transmitted in the time window, and refrain from transmitting the information over the channel by using the DRX or eDRX scheme in the time window when the information does not need to be transmitted in the time window. The channel includes a paging channel, and the information includes a paging message. And/or, the channel includes a control channel, and the information includes control channel scheduling information.

According to an implementation mode of the embodiment of the disclosure, the UE is such UE that stops monitoring the channel and continues to monitor the wake-up signal after entering a sleep mode when the UE does not receive the information in the time window.

According to an implementation mode of the embodiment of the disclosure, the UE is such UE that enters a sleep mode upon determining according to system information or a broadcast that a network side apparatus supports transmission of the wake-up signal, or is such UE that enters the sleep mode according to a network configuration.

According to an implementation mode of the embodiment of the disclosure, when the UE entering a sleep mode from an idle or inactive state enters the idle or inactive state after being woken up by the wake-up signal, a length of the time window is prescribed by a protocol, configured by a network side apparatus via a broadcast, or configured by the network side apparatus via dedicated signaling.

According to an implementation mode of the embodiment of the disclosure, the time window is implemented by using a timer, or is a period of time for receiving N paging messages. N is an integer equal to or more than 1.

According to an implementation mode of the embodiment of the disclosure, when the UE entering a sleep mode from a connected state enters the connected state after being woken up upon reception of the wake-up signal, a length of the time window is configured by a network side apparatus via dedicated signaling.

According to an implementation mode of the embodiment of the disclosure, the time window is implemented by using a timer.

According to an implementation mode of the embodiment of the disclosure, the wake-up signal transmitting module is further configured to transmit the wake-up signal to the UE so that the UE in a sleep mode reads system information when the system information is update.

An embodiment of the disclosure provides another apparatus for monitoring a channel. The apparatus includes a memory and a processor. The memory is configured to store program instructions. The processor is configured to read and execute the program instructions stored in the memory to: monitor a channel by using a DRX or eDRX scheme in a time window after UE is woken up upon reception of a wake-up signal; process information when the UE receives the information in the time window; and stop monitoring the channel and continue to monitor the wake-up signal when the UE does not receive the information in the time window. The channel includes a paging channel, and the information includes a paging message. And/or, the channel includes a control channel, and the information includes control channel scheduling information.

An embodiment of the disclosure provides another apparatus for transmitting information. The apparatus includes a memory and a processor. The memory is configured to store program instructions. The processor is configured to read and execute the program instructions stored in the memory to: transmit a wake-up signal to UE; transmit information over a channel in a time window by using a DRX or eDRX scheme when the information needs to be transmitted in the time window; and refrain from transmitting the information over the channel by using a DRX or eDRX scheme in the time window when the information does not need to be transmitted in the time window. The channel includes a paging channel, and the information includes a paging message. And/or, the channel includes a control channel, and the information includes control channel scheduling information.

An embodiment of the disclosure provides a computer storage medium. The computer storage medium stores computer executable instructions on it. When the computer executable instructions are executed by a computer, the computer performs any one of the methods according to the embodiments above of the disclosure.

BRIEF DESCRIPTION OF THE DRAWINGS

The drawings described below are intended to help understanding of the disclosure, and constitute a part of the disclosure. The embodiments of the disclosure and the description thereof are intended to explain the disclosure instead of to limiting the disclosure unduly.

DETAILED DESCRIPTION OF THE EMBODIMENTS

With the development of wireless communication systems, types of UE and types of services have been diversified, and demands for saving power of the UE and saving network resources and demands for meeting requirements of various services exist concurrently. In order to save power of the UE but also provide accessibility of the service, a wake-up signal is introduced, and when UE monitors the wake-up signal, the UE consumes low power; and the UE starts a communication module (which consumes more power) upon reception of the wake-up signal thereof to receive a paging message. However, there has been absent so far a specific solution to coordinating the use of the wake-up signal with reception of the paging message.

In view of this, the embodiments of the disclosure provide a solution to monitoring a channel so as to address the problem above. Particular embodiments of the disclosure will be described below with reference to the drawings.

In the following description, embodiments at the UE's side and at the base station's side will be described respectively, and embodiments where the UE and the base station cooperate with each other will be described for better understanding of the solution provided the embodiments of the disclosure. Such a description shall not suggest that the UE and the base station must cooperate with each other or must work separately. In fact, problems at the UE's side and at the base station's side can be addressed, respectively, when the UE and the base station operate separately in the respective embodiments, and a better technical effect can be achieved when both of them cooperate with each other.

Figure 1:
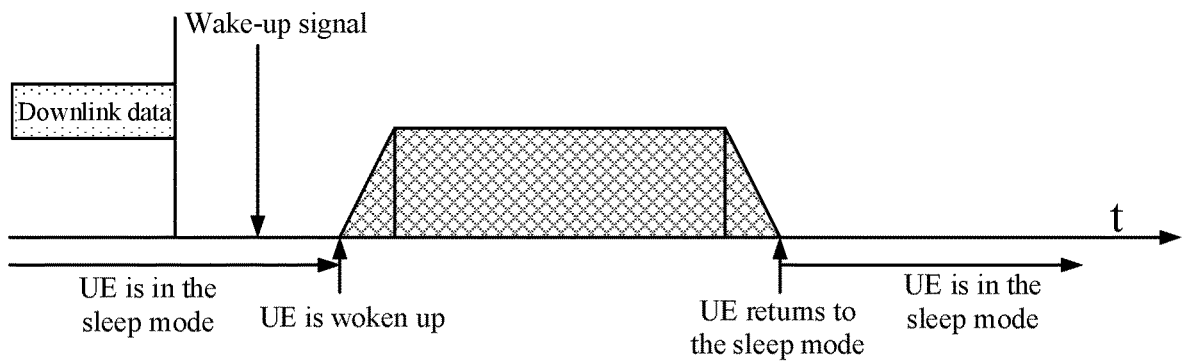
FIG. 1 is a schematic operating diagram of an existing wake-up signal.
Figure 2:
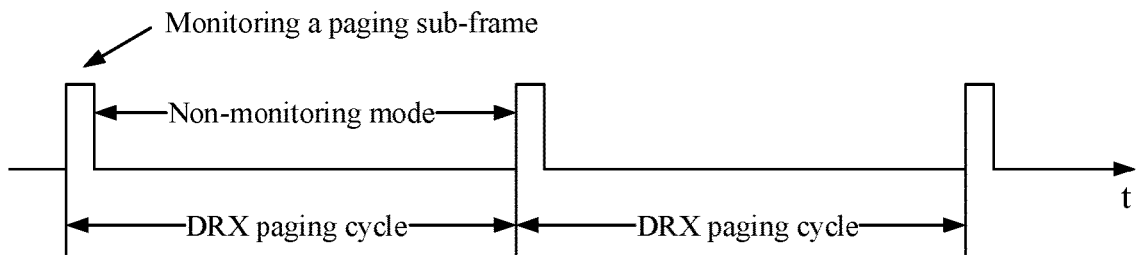
FIG. 2 is a schematic diagram of existing DRX paging.
Figure 3:
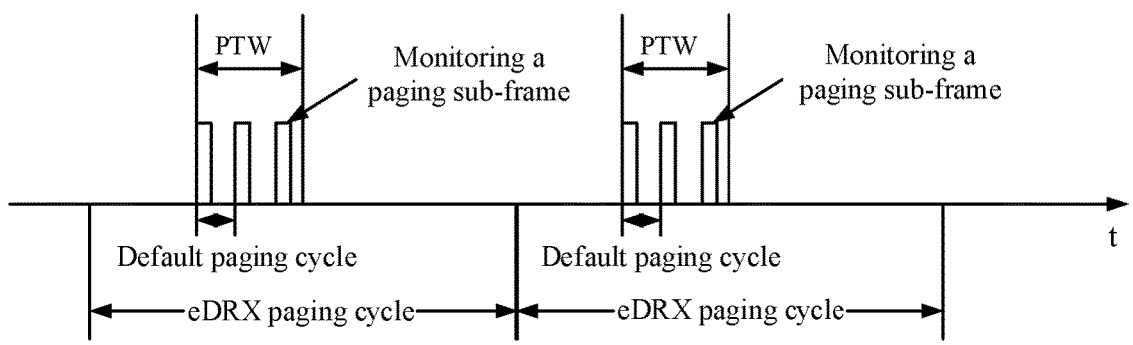
FIG. 3 is a schematic diagram of existing eDRX paging.
Figure 4:
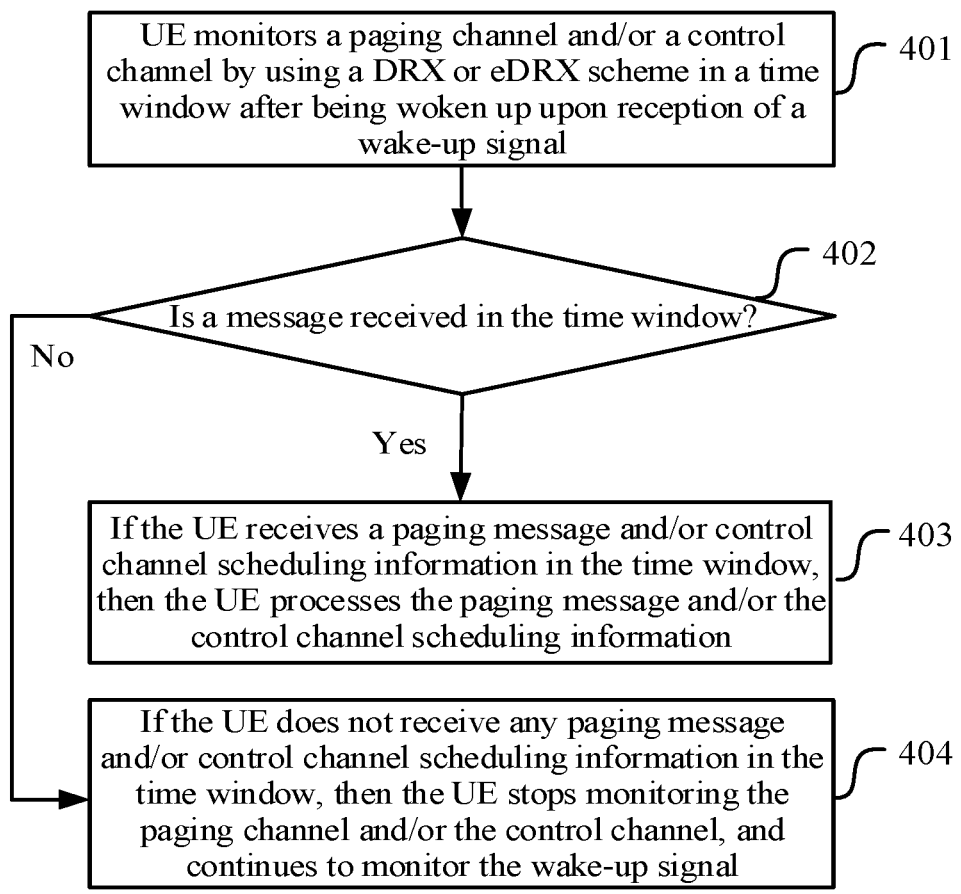
FIG. 4 is a schematic flow chart of a method for monitoring a channel at the UE's side according to an embodiment of the disclosure.

FIG. 4 is a schematic flow chart of a method for monitoring a channel at the UE's side according to an embodiment of the disclosure, and as illustrated in FIG. 4, the method can include the following operations 401-404.

In the operation 401, UE monitors a paging channel and/or a control channel by using a DRX or eDRX scheme in a time window after being woken up upon reception of a wake-up signal.

In the operation 402, the UE determines whether a message is received in the time window, and if so, then the UE proceeds to the operation 403; otherwise, the UE proceeds to the operation 404.

In the operation 403, if the UE receives a paging message and/or control channel scheduling information in the time window, then the UE processes the paging message and/or the control channel scheduling information.

In the operation 404, if the UE does not receive any paging message and/or control channel scheduling information in the time window, then the UE stops monitoring the paging channel and/or the control channel, and continues to monitor the wake-up signal.

According to the embodiment of the disclosure, the UE monitors a paging channel by using the DRX or eDRX scheme, and/or monitors a control channel by using the DRX or eDRX scheme, in a time window after being woken up upon reception of a wake-up signal. If the UE receives a paging message in the time window, it processes the paging message; and/or, if the UE receives control channel scheduling information in the time window, it processes the control channel scheduling information. If the UE does not receive any paging message and/or control channel scheduling information, then it stops monitoring the paging channel and/or the control channel, and continues to monitor the wake-up signal.

The paging channel according to this embodiment is a downlink transmission channel for transmitting data related to a paging process.

The wake-up signal may be a wake-up signal transmitted by a network side apparatus.

According to an implementation mode of the embodiment of the disclosure, the UE in an idle or inactive or connected mode enters a sleep mode, and receives the wake-up signal from the network side apparatus.

The UE may enter the sleep mode upon determining according to system information or a broadcast that the network side apparatus supports transmission of the wake-up signal, or may enter the sleep mode according to a network configuration.

According to an implementation mode of the embodiment of the disclosure, the network side apparatus announces whether it supports transmission of the wake-up signal according to system information or a broadcast, and only if this attribute is supported by the network side apparatus, then the UE may enter the sleep mode. According to another implementation mode of the embodiment of the disclosure, whether the UE enters the sleep mode can be configured by the network side apparatus.

According to an implementation mode of the embodiment of the disclosure, the UE monitors the paging channel and/or the control channel by using the DRX or eDRX scheme in the time window after being woken up upon reception of the wake-up signal as follows: after being woken up upon reception of the wake-up signal, the UE entering the sleep mode from the idle or inactive state enters the idle or inactive state, starts the time window, and monitors the paging channel by using the DRX or eDRX scheme in the time window, where the length of the time window is prescribed by a protocol, configured by the network side apparatus via a broadcast, or configured by the network side apparatus via dedicated signaling.

According to an implementation mode of the embodiment of the disclosure, upon reception of the wake-up signal transmitted by the network side apparatus, the UE entering the sleep mode from the idle or inactive state enters the idle or inactive state, starts a time window, and monitors a paging message by using the DRX or eDRX scheme, where the length of the time window is prescribed by the protocol, configured by the network side apparatus via a broadcast, or configured by the network side apparatus via dedicated signaling.

The time window may be implemented by using a timer, or may be a period of time for receiving N paging messages, where N is an integer equal to or more than 1.

According to an implementation mode of the embodiment of the disclosure, the time window can implemented by using a timer, or can be a period of time for receiving N paging messages, where N is an integer equal to or more than 1. The time window can be prescribed by the protocol, configured by the network side apparatus via a broadcast, or configured by the network side apparatus via dedicated signaling.

That the UE continues to monitor the wake-up signal may happen after the UE enters the sleep mode.

According to an implementation mode of the embodiment of the disclosure, if the UE receives the paging message in the time window, it processes the paging message and then transmits and receives data; and if the UE does not receive any paging message in the time window, it stops monitoring the paging message, enters the sleep mode, and then continues to monitor the wake-up signal.

According to an implementation mode of the embodiment of the disclosure, after being woken up upon reception of the wake-up signal, the UE entering the sleep mode from the connected state re-enters the connected state, starts a time window, and monitors the control channel by using the DRX or eDRX scheme in the time window, where the length of the time window is configured by the network side apparatus via dedicated signaling.

The time window may be implemented by using a timer.

According to an implementation mode of the embodiment of the disclosure, upon reception of the wake-up signal transmitted by the network side apparatus, the UE entering the sleep mode from the connected state re-enters the connected state, starts a time window, and monitors a downlink control channel by using the DRX or eDRX scheme in the time window, where the length of the time window is configured by the network side apparatus via dedicated signaling. The time window may implemented by using a timer.

When the UE in the sleep mode has uplink data to transmit, the method may further include waking up the UE and transmitting the uplink data.

According to an implementation mode of the embodiment of the disclosure, if the UE in the sleep mode has uplink data to transmit, then the UE wakes itself up, and transmits the uplink data.

The method may further includes that the UE reads system information after being woken up, or, that the UE in the sleep mode reads system information and enters the sleep mode, after being woken up by a wake-up signal transmitted by the network side apparatus when the system information is updated.

According to an implementation mode of the embodiment of the disclosure, after the UE is woken up, the UE reads the system information again to ensure that the current system information is up-to-date. Or when the UE is in the sleep mode, if system information is updated, then the network side apparatus transmits a wake-up signal to wake up the UE to read the latest system information, and the UE returns to the sleep mode after reading the system information.

An embodiment at the base station's side will be described below. Since the embodiment at the base station's side corresponds to the embodiment at the UE's side to an extent, reference can be made to the embodiment above at the UE's side for details of the embodiment at the base station's side.

Figure 5:
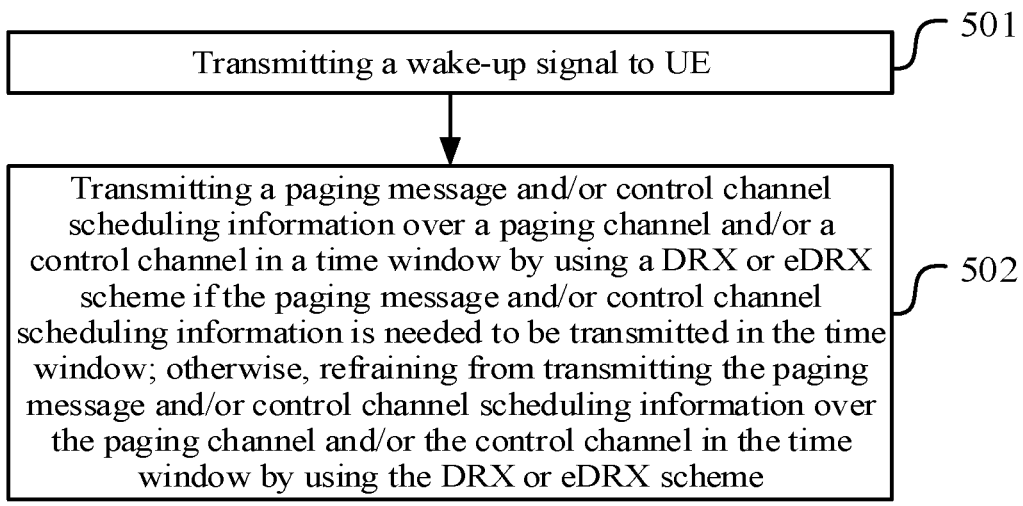
FIG. 5 is a schematic flow chart of a method for transmitting information at the base station's side according to an embodiment of the disclosure.

FIG. 5 is a schematic flow chart of a method for transmitting information at the base station's side according to an embodiment of the disclosure. As illustrated in FIG. 5, the method can include the following operations 501 and 502.

Operation 501: transmitting a wake-up signal to UE.

Operation 502: transmitting a paging message and/or control channel scheduling information over a paging channel and/or a control channel in a time window by using a DRX or eDRX scheme if the paging message and/or control channel scheduling information is needed to be transmitted in the time window; otherwise, refraining from transmitting the paging message and/or control channel scheduling information over the paging channel and/or the control channel in the time window by using the DRX or eDRX scheme.

According to an implementation mode of the embodiment of the disclosure, the UE is such a UE that if the UE does not receive any paging message and/or control channel scheduling information in the time window, then the UE stops monitoring the paging channel and/or the control channel and continues to monitor the wake-up signal after entering a sleep mode.

According to an implementation mode of the embodiment of the disclosure, the UE enters the sleep mode upon determining according to system information or a broadcast that the network side apparatus supports transmission of the wake-up signal, or enters the sleep mode according to a network configuration.

According to an implementation mode of the embodiment of the disclosure, when the UE entering the sleep mode from an idle or inactive state enters the idle or inactive state after being woken up by the wake-up signal, the length of the time window is prescribed by a protocol, configured by the network side apparatus via a broadcast, or configured by the network side apparatus via dedicated signaling.

According to an implementation mode of the embodiment of the disclosure, the time window is implemented by using a timer, or the time window is a period of time for receiving N paging messages, where N is an integer equal to or more than 1.

According to an implementation mode of the embodiment of the disclosure, when the UE entering the sleep mode from a connected state enters the connected state after being woken up upon reception of the wake-up signal, the length of the time window is configured by the network side apparatus via dedicated signaling.

According to an implementation mode of the embodiment of the disclosure, the time window is implemented by using a timer.

According to an implementation mode of the embodiment of the disclosure, the method for transmitting information can further include: when system information is updated, the wake-up signal is transmitted to the UE so that the UE in the sleep mode reads the system information.

Several examples are illustrated below. In these examples, the DRX scheme is used. As can be apparent to those skilled in the art, the difference between the DRX and eDRX schemes lies in their different paging cycles. When the UE uses the DRX paging scheme, the paging cycle of the UE is the shorter one of the UE-specific paging cycle of the core network and the default paging cycle broadcasted by the base station, whereas the paging cycle of the UE using the eDRX scheme involves an eDRX paging cycle of the core network and the PTW, in which the UE monitors a paging message according to the default paging cycle broadcasted by the base station. As such, those skilled in the art can adapt the methods according to the examples below to the eDRX scheme by modifying the paging cycle of the DRX scheme accordingly.

First Example

The first example illustrates an implementation mode of waking up the UE to receive a paging message.

When the UE is configured by the network side apparatus to enter the idle or inactive state, the UE may enter the sleep mode. After the UE in the idle or inactive state camps on in a cell supporting transmitting of the wake-up signal, the UE enters the sleep mode, and only receives the wake-up signal from the network side apparatus.

Figure 6:
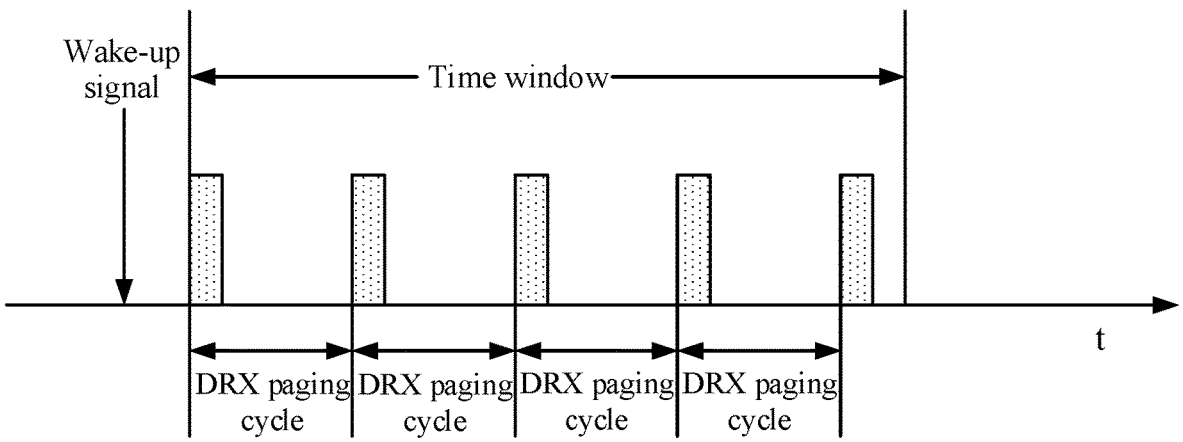
FIG. 6 is a schematic diagram of a time window according to a first example of the disclosure.

FIG. 6 is a schematic diagram of a time window according to the first example. As illustrated by FIG. 6, upon reception of the wake-up signal transmitted by the network side apparatus, the UE enters the idle or inactive state, starts a time window, and monitors a paging message by using the DRX scheme in the time window. Moreover, after the UE is woken up, the UE reads system information again so that the current system information is up-to-date. The length of the time window is configured by the network side apparatus via a broadcast or dedicated signaling. The time window may be implemented by using a timer, or may be a period of time for receiving N (N=5) paging messages, as illustrated by FIG. 6.

If the UE receives the paging message in the time window, then it processes the paging message and subsequently transmits and receives data. If the UE does not receive any paging message in the time window, then it stops monitoring the paging message, enters the sleep mode, and continues to monitor the wake-up signal.

If the UE in the sleep mode has uplink data to transmit, then it is woken up directly to transmit the uplink data.

Second Example

This example illustrates an implementation mode of waking up the UE to transmit and receive data.

The UE in the connected state is configured by the network side apparatus to enter the sleep mode via dedicated signaling. The UE in the sleep mode only receives the wake-up signal from the network side apparatus.

Figure 7:
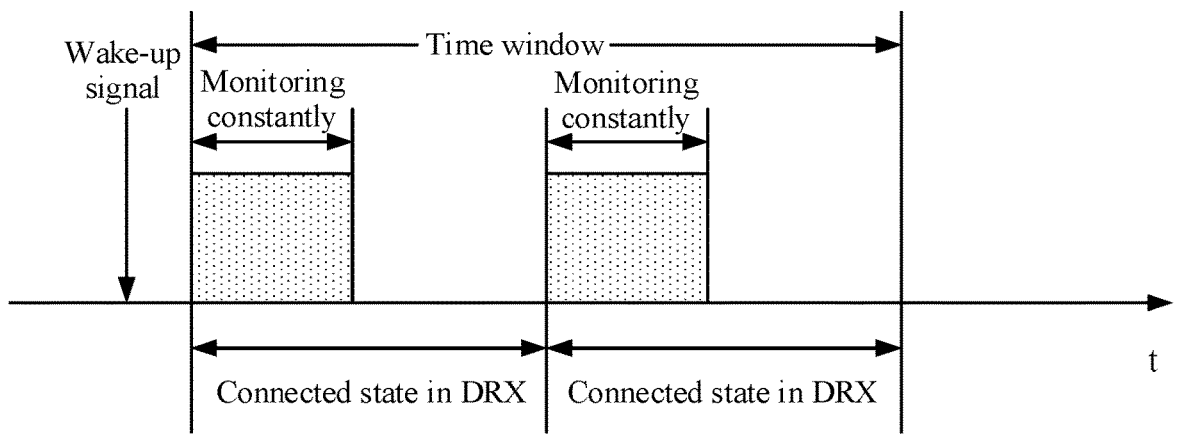
FIG. 7 is a schematic diagram of a time window according to a second example of the disclosure.

FIG. 7 is a schematic diagram of a time window according to the second example. As illustrated by FIG. 7, upon reception of the wake-up signal transmitted from the network side apparatus, the UE enters the connected state, starts a time window, and monitors a downlink control channel in the time window constantly by using the DRX scheme if the DRX mode is configured by the network side apparatus. If the DRX mode is not configured by the network side apparatus, then the UE monitors the downlink control channel constantly. In the time window. The length of the time window is configured by the network side apparatus via dedicated signaling, and may be implemented by using a timer.

If the UE receives scheduling information over a downlink control channel in the time window, then it transmits and receives data. If the UE does not receive any scheduling information over the downlink control channel in the time window, then it stops monitoring the downlink control channel, enters the sleep mode, and continues to monitor the wake-up signal.

If the UE in the sleep mode has uplink data to transmit, then it is woken up directly to transmit the uplink data.

Third Example

This example illustrates an implementation mode of waking up the UE to update system information.

When the UE is configured by the network side apparatus to enter the idle or inactive state, the UE may enter the sleep mode. After the UE in the idle or inactive state camps on in a cell supporting transmission of the wake-up signal, the UE enters the sleep mode, and only receives the wake-up signal from the network side apparatus.

The UE in the connected state is configured by the network side apparatus via dedicated signaling to enter the sleep mode. Upon reception of the wake-up signal transmitted by the network side apparatus, the UE in the sleep mode enters the idle or inactive or connected state, starts a time window, and monitors a paging message or a control channel in the time window by using the DRX scheme. The length of the time window is configured by the network side apparatus via a broadcast or dedicated signaling. The time window can be implemented by using a timer.

When system information of the network side apparatus is updated, every UE in the sleep mode in the cell are woken up by the network side. After the UE is woken up, the UE receives in the time window a paging message indicating that the system information is updated. Then the UE receives the system information, and returns to the sleep mode upon reception of the system information.

Based upon the same inventive conception, embodiments of the disclosure further provide an apparatus for monitoring a channel and an apparatus for transmitting information. Since these apparatuses address the problem under a similar principle to the method for monitoring a channel and the method for transmitting information, reference can be made to the embodiments above of the methods for details of the embodiments of these apparatuses, and a repeated description thereof is omitted herein.

Figure 8:
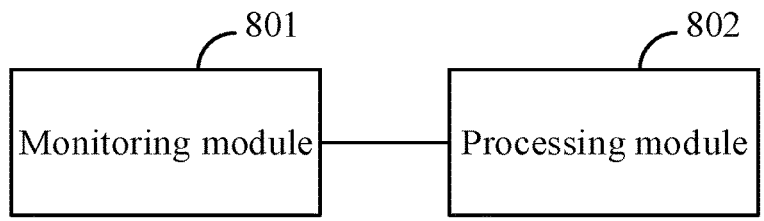
FIG. 8 is a schematic structural diagram of an apparatus for monitoring a channel at the UE's side according to an embodiment of the disclosure.

FIG. 8 is a schematic structural diagram of an apparatus for monitoring a channel at the UE's side according to an embodiment of the disclosure. As illustrated by FIG. 8, the apparatus includes a monitoring module 801 and a processing module 802.

The monitoring module 801 is configured to monitor a paging channel and/or a control channel by using a DRX or eDRX scheme in a time window after UE is woken up upon reception of a wake-up signal.

The processing module 802 is configured to: process a paging message and/or control channel scheduling information if the UE receives the paging message and/or the control channel scheduling information in the time window; and stop monitoring the paging channel and/or the control channel and continue to monitor the wake-up signal if the UE does not receive the paging message and/or the control channel scheduling information in the time window.

According to an implementation mode of the embodiment of the disclosure, when the processing module is configured to continue to monitor the wake-up signal, the processing module is further configured to continue to monitor the wake-up signal after entering a sleep mode.

According to an implementation mode of the embodiment of the disclosure, when the monitoring module is configured to receive the wake-up signal, the monitoring module is further configured to receive the wake-up signal transmitted by a network side apparatus.

According to an implementation mode of the embodiment of the disclosure, the UE is such UE that enters a sleep mode upon determining according to system information or a broadcast that the network side apparatus supports transmission of the wake-up signal, or is such UE that enters the sleep mode according to a network configuration.

According to an implementation mode of the embodiment of the disclosure, when the monitoring module is configured to monitor the paging channel and/or the control channel by using the DRX or eDRX scheme in the time window after the UE is woken up upon reception of the wake-up signal, the monitoring module is further configured to: enter an idle or inactive state, start a time window, and monitor a paging channel by using the DRX or eDRX scheme in the time window, after the UE entering a sleep mode from the idle or inactive state is woken up upon reception of the wake-up signal, where a length of the time window is prescribed by a protocol, configured by the network side apparatus via a broadcast, or configured by the network side apparatus via dedicated signaling.

According to an implementation mode of the embodiment of the disclosure, the time window is implemented by using a timer, or is a period of time for receiving N paging messages, where N is an integer equal to or more than 1.

According to an implementation mode of the embodiment of the disclosure, the monitoring module is further configured to enter a connected state, start a time window, and monitor a control channel by using the DRX or eDRX scheme in the time window, after the UE entering a sleep mode from the connected state is woken up upon reception of the wake-up signal, where a length of the time window is configured by the network side apparatus via dedicated signaling.

According to an implementation mode of the embodiment of the disclosure, the time window is implemented by using a timer.

According to an implementation mode of the embodiment of the disclosure, the apparatus further includes an uplink data transmitting module. The uplink data transmitting module is configured to wake up the UE and transmit uplink data when the UE in a sleep mode needs to transmit the uplink data.

According to an implementation mode of the embodiment of the disclosure, the apparatus further includes an updating module. The updating module is configured to: read system information after the UE is woken up; or read the system information and enter a sleep mode after the UE in the sleep mode is woken up by the wake-up signal transmitted by the network side apparatus when the system information is updated, to read the system information, and to enter the sleep mode.

Figure 9:
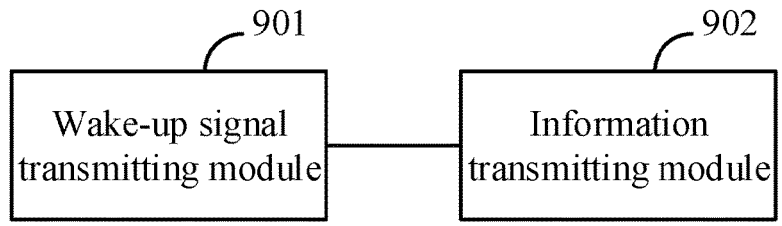
FIG. 9 is a schematic structural diagram of an apparatus for transmitting information at the base station's side according to an embodiment of the disclosure.

FIG. 9 is a schematic structural diagram of an apparatus for transmitting information at the base station's side. As illustrated by FIG. 9, the apparatus includes a wake-up signal transmitting module 901 and an information transmitting module 902.

The wake-up signal transmitting module 901 is configured to transmit a wake-up signal to UE.

The information transmitting module 902 is configured to: transmit a paging message and/or control channel scheduling information over a paging channel and/or a control channel in a time window by using a DRX or eDRX scheme, if the paging message and/or the control channel scheduling information needs to be transmitted in the time window; and refrain from transmitting the paging message and/or the control channel scheduling information over the paging channel and/or the control channel in the time window if the paging message and/or the control channel scheduling information does not need to be transmitted in the time window.

According to an implementation mode of the embodiment of the disclosure, the UE is such UE that stops monitoring the paging channel and/or the control channel and continues to monitor the wake-up signal after entering a sleep mode if the UE does not receive the paging message and/or the control channel scheduling information in the time window.

According to an implementation mode of the embodiment of the disclosure, the UE is such UE that enters a sleep mode upon determining according to system information or a broadcast that the network side apparatus supports transmission of the wake-up signal, or is such UE that enters the sleep mode according to a network configuration.

According to an implementation mode of the embodiment of the disclosure, when the UE entering a sleep mode from an idle or inactive state enters the idle or inactive state after being woken up by the wake-up signal, a length of the time window is prescribed by a protocol, configured by a network side apparatus via a broadcast, or configured by the network side apparatus via dedicated signaling.

According to an implementation mode of the embodiment of the disclosure, the time window is implemented by using a timer, or is a period of time for receiving N paging messages, where N is an integer equal to or more than 1.

According to an implementation mode of the embodiment of the disclosure, when the UE entering a sleep mode from a connected state enters the connected state after being woken up upon reception of the wake-up signal, a length of the time window is configured by a network side apparatus via dedicated signaling.

According to an implementation mode of the embodiment of the disclosure, the time window is implemented by using a timer.

According to an implementation mode of the embodiment of the disclosure, the wake-up signal transmitting module is further configured to transmit the wake-up signal to the UE so that the UE in a sleep mode reads system information when the system information is updated.

Each part of the apparatuses above has been described in the form of modules or units according to their functionalities. Of course, the functionalities of the respective modules or units can also be performed by one or more pieces of software or hardware.

The technical solutions according to the embodiments of the disclosure can be implemented as follows.

Figure 10:
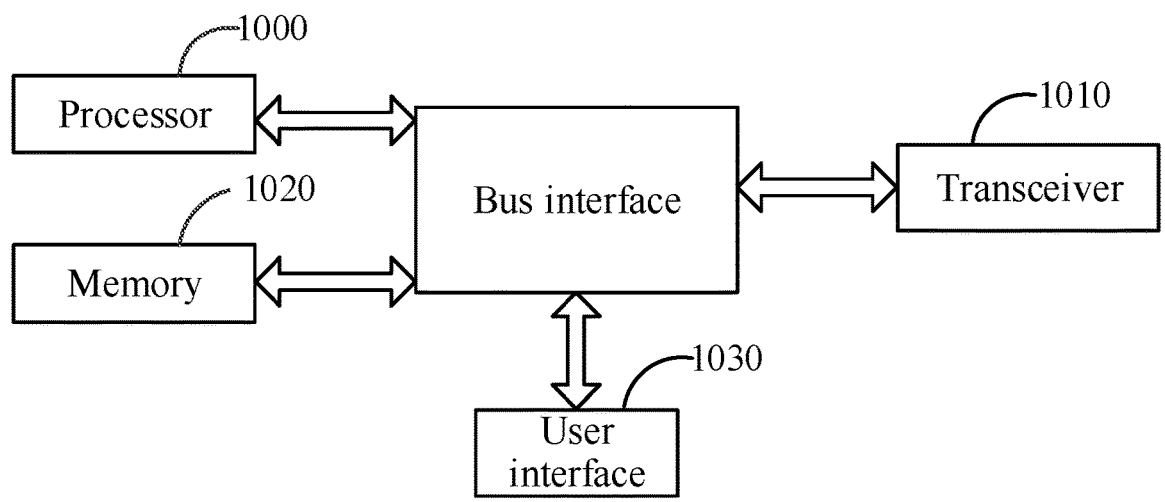
FIG. 10 is a schematic structural diagram of UE according to an embodiment of the disclosure.

FIG. 10 is a schematic structural diagram of UE according to an embodiment of the disclosure. As illustrated by FIG. 10, the UE includes a memory 1020 and a processor 1000.

The memory 1020 is configured to store program instructions.

The processor 1000 is configured to read and execute the program instructions stored in the memory 1020 to perform the following operations: monitoring a paging channel and/or a control channel by using a DRX or eDRX scheme in a time window after the UE is woken up upon reception of a wake-up signal; processing a paging message and/or control channel scheduling information if the UE receives the paging message and/or the control channel scheduling information in the time window; and stopping monitoring the paging channel and/or the control channel and continue to monitor the wake-up signal if the UE does not receive the paging message and/or the control channel scheduling information in the time window.

According to an implementation mode of the embodiment of the disclosure, processing the paging message and/or the control channel scheduling information if the UE receives the paging message and/or the control channel scheduling information in the time window, includes: processing the paging message if the UE receives the paging message in the time window; and/or, processing control channel scheduling information if the UE receives the control channel scheduling information in the time window.

According to an implementation mode of the embodiment of the disclosure, continuing to monitor the wake-up signal includes: continuing to monitor the wake-up signal after entering a sleep mode.

According to an implementation mode of the embodiment of the disclosure, the wake-up signal is transmitted by a network side apparatus.

According to an implementation mode of the embodiment of the disclosure, the UE enters a sleep mode upon determining according to system information or a broadcast that a network side apparatus supports transmission of the wake-up signal, or enters the sleep mode according to a network configuration.

According to an implementation mode of the embodiment of the disclosure, monitoring the paging channel and/or the control channel by using the DRX or eDRX scheme in the time window after the UE is woken up upon reception of the wake-up signal includes: entering an idle or inactive state, starting a time window, and monitoring the paging channel by using the DRX or eDRX scheme in the time window, after the UE entering a sleep mode from the idle or inactive state is woken up upon reception of the wake-up signal, where a length of the time window is prescribed by a protocol, configured by a network side apparatus via a broadcast, or configured by the network side apparatus via dedicated signaling.

According to an implementation mode of the embodiment of the disclosure, the time window is implemented by using a timer, or is a period of time for receiving N paging messages, where N is an integer equal to or more than 1.

According to an implementation mode of the embodiment of the disclosure, monitoring the paging channel and/or the control channel by using the DRX or eDRX scheme in the time window after the UE is woken up upon reception of the wake-up signal includes: entering a connected state, starting a time window, and monitoring the control channel by using the DRX or eDRX scheme in the time window, after the UE entering a sleep mode from the connected state is woken up upon reception of the wake-up signal, wherein a length of the time window is configured by a network side apparatus via dedicated signaling.

According to an implementation mode of the embodiment of the disclosure, the time window is implemented by using a timer.

According to an implementation mode of the embodiment of the disclosure, when the UE in a sleep mode has uplink data to transmit, the processor is further configured to read and execute the program instructions stored in the memory to perform the following operations: waking up the UE, and transmitting the uplink data.

According to an implementation mode of the embodiment of the disclosure, the processor is further configured to read and execute the program instructions stored in the memory to perform the following operation: reading system information after the UE is woken up; or, reading the system information, and entering a sleep mode, after the UE in the sleep mode is woken up by the wake-up signal transmitted by the network side apparatus when the system information is updated.

In FIG. 10, the bus architecture can include any number of interconnecting buses and bridges to link together various circuits including one or more processors represented by the processor 1000 and one or more memories represented by the memory 1020. The bus architecture can further link together various other circuits such as a peripheral device, a manostat and a power management circuit, all of which are well known in the art, so a further description thereof is omitted herein. The bus interface serves as an interface. The transceiver 1010 can be a number of elements, i.e., it includes a transmitter and a receiver, providing units for communication with various other devices over a transmission medium. For different user equipment, the user interface 1030 can also be an interface via which devices are connected internally and externally as needed, and the connected devices include but are not limited to a keypad, a monitor, a speaker, a microphone, a joystick, etc.

The processor 1000 is responsible for managing the bus architecture and performing normal processing, and the memory 10320 can store data for use by the processor 1000 when performing the operations.

Figure 11:
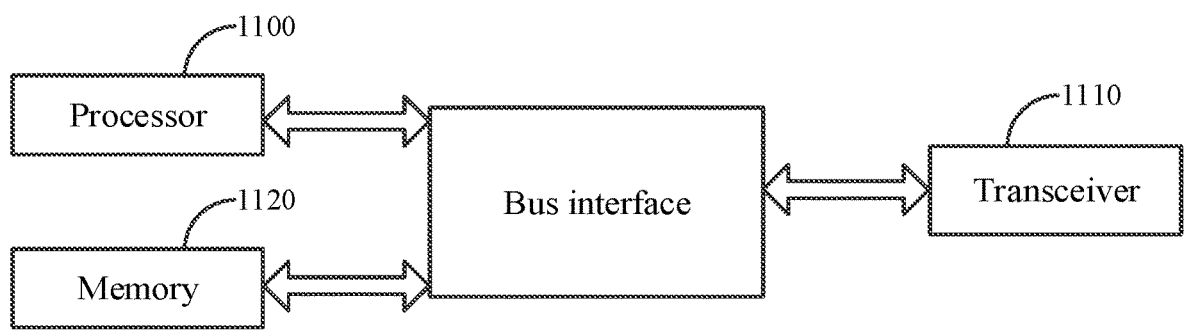
FIG. 11 is a schematic structural diagram of a base station according to an embodiment of the disclosure.

FIG. 11 is a schematic structural diagram of a base station according to an embodiment of the disclosure. As illustrated by FIG. 11, the base station includes a memory 1120 and a processor 1100.

The memory 1120 is configured to store program instructions.

The processor 1100 is configured to read the program instructions stored in the memory 1120 to perform the following operations: transmitting a wake-up signal to UE; transmitting a paging message and/or control channel scheduling information over a paging channel and/or a control channel in a time window by using a DRX or eDRX scheme when the paging message and/or the control channel scheduling information needs to be transmitted in the time window; and refraining from transmitting the paging message and/or the control channel scheduling information over the paging channel and/or the control channel by using the DRX or eDRX scheme in the time window when the paging message and/or the control channel scheduling information does not need to be transmitted in the time window.

According to an implementation mode of the embodiment of the disclosure, the UE is such UE that stops monitoring the paging channel and/or the control channel and continues to monitor the wake-up signal after entering a sleep mode if the UE does not receive the paging message and/or the control channel scheduling information in the time window.

According to an implementation mode of the embodiment of the disclosure, the UE is such UE that enters a sleep mode upon determining according to system information or a broadcast that a network side apparatus supports transmission of the wake-up signal, or is such UE that enters the sleep mode according to a network configuration.

According to an implementation mode of the embodiment of the disclosure, when the UE entering the sleep mode from an idle or inactive state enters the idle or inactive state after being woken up by the wake-up signal, a length of the time window is prescribed by a protocol, configured by the network side apparatus via a broadcast, or configured by the network side apparatus via dedicated signaling.

According to an implementation mode of the embodiment of the disclosure, the time window is implemented by using a timer, or may be a period of time for receiving N paging messages. N is an integer equal to or more than 1.

According to an implementation mode of the embodiment of the disclosure, when the UE entering the sleep mode from a connected state enters the connected state after being woken up upon reception of the wake-up signal, the length of the time window is configured by the network side apparatus via dedicated signaling.

According to an implementation mode of the embodiment of the disclosure, the time window is implemented by using a timer.

According to an implementation mode of the embodiment of the disclosure, the processor is further configured to read the program instructions stored in the memory to perform the following operation: transmitting the wake-up signal to the UE so that the UE in the sleep mode reads system information when the system information is updated.

In FIG. 11, the bus architecture can include any number of interconnecting buses and bridges to link together various circuits including one or more processors represented by the processor 1100 and one or more memories represented by the memory 1120. The bus architecture can further link together various other circuits such as a peripheral device, a manostat, and a power management circuit, all of which are well known in the art, so a further description thereof is omitted herein. The bus interface 1130 serves as an interface. The transceiver 1110 can be a number of elements, i.e., it includes a transmitter and a receiver, providing units for communication with various other devices over a transmission medium. The processor 1100 is responsible for managing the bus architecture and performing normal processing, and the memory 1120 can store data for use by the processor 1100 when performing the operations.

The apparatus for monitoring a channel according to any one of the implementation modes of the embodiment above of the disclosure can be any kind of terminals, for example.

The terminals can also be referred to as UE, a mobile station (hereinafter "MS"), a mobile terminal, a mobile telephone, and etc. The terminal can communicate with one or more core networks over a radio access network (hereinafter "RAN"). For example, the terminal can be a mobile phone (or referred to as a cell phone), a computer having a mobile character, and etc. The terminal can also be a portable, pocket, handheld, built-in-computer, or on-vehicle mobile device.

The apparatus for transmitting information according to any one of the implementation modes of the embodiment above of the disclosure can be any kind of network device, for example.

The network device can be a base station (e.g., an access point), which refers to such a device in an access network that communicates with a radio terminal over one or more sectors via a radio interface. The base station can be configured to convert a received air frame into an internet protocol (hereinafter "IP") packet, and a received IP packet into an air frame, and can operate as a router between the radio terminal and the remaining components of the access network. The remaining components of the access network can include an IP network. The base station can further coordinate attribute management of the air interface. For example, the base station can be a base transceiver station (hereinafter "BTS") in a global system for mobile communications (hereinafter "GSM") or code division multiple access (hereinafter "CDMA") system, or can be a base station (Node B) in a wideband code division multiple access (hereinafter "WCDMA") system, or can be an evolved Node B (hereinafter "eNB" or "e-Node B") in an LTE system, or a gNB in a 5G system, although the embodiment of the disclosure is not limited thereto.

An embodiment of the disclosure provides a computer storage medium configured to store computer executable instructions for any one of the apparatuses according to the embodiments above of the disclosure, where the computer executable instructions include program configured to perform any one of the methods according to the embodiments above of the disclosure.

The computer storage medium can be any available medium or data storage device accessible to computers. It includes but is not limited to a magnetic medium such as a floppy disk, a hard disk, a magnetic tape, or a magneto-optical disk (hereinafter "MO") disk, an optical medium such as a compact disk (hereinafter "CD"), a digital versatile disk (hereinafter "DVD"), a Blu-ray disk (hereinafter "BD"), or a holographic versatile disk (hereinafter "HVD"), or a semiconductor medium such as a read-only memory (hereinafter "ROM"), an electrically erasable programmable read-only memory (hereinafter "EPROM"), an electrically erasable programmable read-only memory (hereinafter "EEPROM"), a nonvolatile memory (e.g., a NAND flash), or a solid-state drive (hereinafter "SSD").

In summary, in the technical solutions according to the embodiments of the disclosure, UE monitors a paging channel and/or a control channel by using the DRX or eDRX scheme in a time window after being woken up upon reception of a wake-up signal. If the UE receives a paging message or control channel scheduling information in the time window, it processes the paging message and/or the control channel scheduling information. If the UE does not receive the paging message or control channel scheduling information in the time window, then it stops monitoring the paging channel or the control channel, and continues to monitor the wake-up signal.

The solutions according to the embodiments of the disclosure can save power of the UE, and also make services accessible to the UE.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for monitoring a channel, comprising:
monitoring, by user equipment (UE), a channel by using a discontinuous reception (DRX) or extended DRX (eDRX) scheme in a time window after being woken up upon reception of a wake-up signal from a network side apparatus; wherein the time window is a period of time for receiving N paging messages, wherein N is an integer more than 1;
processing information when the UE receives the information in the time window; and
stopping monitoring the channel, and continuing to monitor the wake-up signal when the UE does not receive the information in the time window;
wherein the channel comprises a paging channel, and the information comprises a paging message; and/or, the channel comprises a control channel, and the information comprises control channel scheduling information;
wherein monitoring, by the UE, the channel by using the DRX or eDRX scheme in the time window after being woken up upon reception of the wake-up signal from the network side apparatus comprises:

entering an idle or inactive state, starting a time window, and monitoring the paging channel by using the DRX or eDRX scheme in the time window, after the UE entering a sleep mode from the idle or inactive state is woken up upon reception of the wake-up signal, wherein a length of the time window is prescribed by a protocol, configured by the network side apparatus via a broadcast, or configured by the network side apparatus via dedicated signaling; or entering a connected state, starting a time window, and monitoring the control channel by using the DRX or eDRX scheme in the time window, after the UE entering a sleep mode from the connected state is woken up upon reception of the wake-up signal, wherein a length of the time window is configured by the network side apparatus via dedicated signaling.

2. The method according to claim 1, wherein continuing to monitor the wake-up signal comprises:
continuing to monitor the wake-up signal after entering the sleep mode.

3. The method according to claim 1, wherein the UE enters the sleep mode upon determining according to system information or a broadcast that the network side apparatus supports transmission of the wake-up signal, or enters the sleep mode according to a network configuration.

4. The method according to claim 1, when the UE in the sleep mode has uplink data to transmit, further comprising:
waking up the UE, and transmitting the uplink data.

5. A method for transmitting information, applied to a network side apparatus, comprising:
transmitting a wake-up signal to UE;
transmitting information over a channel in a time window by using a DRX or eDRX scheme when the information needs to be transmitted in the time window; wherein the time window is a period of time for receiving N paging messages, and N is an integer more than 1; and
refraining from transmitting the information over the channel by using the DRX or eDRX scheme in the time window when the information does not need to be transmitted in the time window;
wherein the channel comprises a paging channel, and the information comprises a paging message; and/or, the channel comprises a control channel, and the information comprises control channel scheduling information;
wherein
when the UE entering a sleep mode from an idle or inactive state enters the idle or inactive state after being woken up by the wake-up signal, a length of the time window is prescribed by a protocol, configured by the network side apparatus via a broadcast, or configured by the network side apparatus via dedicated signaling; or
when the UE entering a sleep mode from a connected state enters the connected state after being woken up upon reception of the wake-up signal, a length of the time window is configured by the network side apparatus via dedicated signaling.

6. The method according to claim 5, wherein the UE is such UE that stops monitoring the channel and continues to monitor the wake-up signal after entering the sleep mode when the UE does not receive the information in the time window.

7. The method according to claim 5, wherein the UE is such UE that enters the sleep mode upon determining according to system information or a broadcast that the network side apparatus supports transmission of the wake-up signal, or is such UE that enters the sleep mode according to a network configuration.

8. An apparatus for monitoring a channel, comprising:
a memory configured to store program instructions; and
a processor configured to read and execute the program instructions stored in the memory to:
monitor a channel by using a DRX or eDRX scheme in a time window after UE is woken up upon reception of a wake-up signal from a network side apparatus; wherein the time window is a period of time for receiving N paging messages, wherein N is an integer more than 1;
process information when the UE receives the information in the time window; and,
stop monitoring the channel and continue to monitor the wake-up signal when the UE does not receive the information in the time window;
wherein the channel comprises a paging channel, and the information comprises a paging message; and/or the channel comprises a control channel, and the information comprises control channel scheduling information;
wherein the processor is further configured to read and execute the program instructions stored in the memory to:
enter an idle or inactive state, start a time window, and monitor the paging channel by using the DRX or eDRX scheme in the time window, after the UE entering a sleep mode from the idle or inactive state is woken up upon reception of the wake-up signal, wherein a length of the time window is prescribed by a protocol, configured by the network side apparatus via a broadcast, or configured by the network side apparatus via dedicated signaling; or
enter a connected state, start a time window, and monitor the control channel by using the DRX or eDRX scheme in the time window, after the UE entering a sleep mode from the connected state is woken up upon reception of the wake-up signal, wherein a length of the time window is configured by the network side apparatus via dedicated signaling.

9. The apparatus according to claim 8, wherein the processor is further configured to read and execute the program instructions stored in the memory to:
continue to monitor the wake-up signal after entering the sleep mode.

10. The apparatus according to claim 8, wherein the UE is such UE that enters the sleep mode upon determining according to system information or a broadcast that the network side apparatus supports transmission of the wake-up signal, or is such UE that enters the sleep mode according to a network configuration.

11. The apparatus according to claim 8, wherein the processor is further configured to read and execute the program instructions stored in the memory to:
wake up itself to transmit uplink data when the UE in the sleep mode needs to transmit the uplink data.

12. A network side apparatus for transmitting information, comprising:
a memory configured to store program instructions;
a processor configured to read and execute the program instructions stored in the memory to:
transmit a wake-up signal to UE;
transmit information over a channel in a time window by using a DRX or eDRX scheme when the information needs to be transmitted in the time window; wherein the time window is a period of time for receiving N paging messages, and N is an integer more than 1; and refrain from transmitting the information over the channel by using a DRX or eDRX scheme in the time window when the information does not need to be transmitted in the time window;

wherein the channel comprises a paging channel, and the information comprises a paging message; and/or, the channel comprises a control channel, and the information comprises control channel scheduling information; wherein when the UE entering a sleep mode from an idle or inactive state enters the idle or inactive state after being woken up by the wake-up signal, a length of the time window is prescribed by a protocol, configured by the network side apparatus via a broadcast, or configured by the network side apparatus via dedicated signaling; or when the UE entering a sleep mode from a connected state enters the connected state after being woken up upon reception of the wake-up signal, a length of the time window is configured by the network side apparatus via dedicated signaling.

13. The network side apparatus according to claim 12, wherein the UE is such UE that stops monitoring the channel and continues to monitor the wake-up signal after entering the sleep mode when the UE does not receive the information in the time window.

14. The network side apparatus according to claim 12, wherein the UE is such UE that enters the sleep mode upon determining according to system information or a broadcast that the network side apparatus supports transmission of the wake-up signal, or is such UE that enters the sleep mode according to a network configuration.

* * * * *